United States Patent
Miyazaki et al.

(10) Patent No.: US 6,678,047 B1
(45) Date of Patent: Jan. 13, 2004

(54) METHOD AND APPARATUS FOR ALIGNING OPTICAL AXES OF OPTICAL COMPONENTS

(75) Inventors: Koichi Miyazaki, Ichihara (JP); Yoshiharu Taga, Ichihara (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 463 days.

(21) Appl. No.: 09/612,257

(22) Filed: Jul. 7, 2000

(30) Foreign Application Priority Data

Jul. 9, 1999 (JP) .................................. 11-195578

(51) Int. Cl.$^7$ .............................................. G01B 11/00
(52) U.S. Cl. ....................................... 356/399; 356/400
(58) Field of Search ................................. 356/399, 400

(56) References Cited

U.S. PATENT DOCUMENTS

| | | | |
|---|---|---|---|
| 5,440,141 A | * | 8/1995 | Horie ................. 250/559.27 |
| 5,916,458 A | * | 6/1999 | Komoriya et al. ........... 356/400 |
| 6,504,611 B2 | * | 1/2003 | Kogan et al. ............... 356/399 |

FOREIGN PATENT DOCUMENTS

| | | |
|---|---|---|
| JP | 6-281850 | 10/1994 |
| JP | 7-287149 | 10/1995 |
| JP | 8-94886 | 4/1996 |
| JP | 8-114725 | 5/1996 |
| JP | 8-262280 | 10/1996 |

* cited by examiner

*Primary Examiner*—Frank G. Font
*Assistant Examiner*—Layla Lauchman
(74) *Attorney, Agent, or Firm*—Oblon, Spivak, McClelland, Maier & Neustadt, P.C.

(57) ABSTRACT

A controller of an optical axis aligning apparatus carries out quadric surface approximation with a plane parallel to a connecting end face of an optical component or an optical fiber, in order to align the emission axis of the optical component and the optical axis of the optical fiber in connecting the component and the fiber, and then carries out quadric function approximation in the direction of an axis perpendicular to the plane related to the quadric surface approximation, thereby securely finding a maximum light quantity point at a lower frequency of stage operation in the aligning apparatus to shorten the tact time for optical axis alignment.

9 Claims, 12 Drawing Sheets

METHOD AND APPARATUS FOR ALIGNING OPTICAL AXES OF OPTICAL COMPONENTS

BACKGROUND OF THE INVENTION

1. Field of the Invention

The present invention relates to an optical axis aligning method for aligning the respective optical axes of an optical component and an optical fiber with speed, accuracy, and ease, in connecting the component and the fiber, and an apparatus therefor.

2. Related Art

In constructing optical devices that include optical elements such as light emitting elements, light receiving elements, optical switches, optical modulators, etc., an optical fiber is connected to another optical fiber or an optical element (hereinafter an optical fiber and an optical element connected to an optical fiber will be collectively referred to as an optical component). In connecting the optical fiber and the optical component, their respective optical axes are aligned with each other, that is, optical axis alignment is carried out.

For example, in connecting the optical fiber with an LD module that includes a laser diode (hereinafter referred to as "LD") element, for use as a light emitting element, and a lens for converging-light emitted from the LD element, it is necessary to align the point of emission on a connecting end face of the LD module and the center of an incidence end face of the optical fiber and align the direction of emission from the LD module and the longitudinal axis of the optical fiber. In other words, the LD module and the optical fiber must be relatively positioned with respect to the X-, Y-, and Z-axes, if a plane that is parallel to the connecting end face of the LD module and the direction perpendicular to the plane are defined as an XY-plane and the Z-axis direction, respectively. The optical axis alignment requires particularly high accuracy when the optical component and the optical fiber are to be connected fixedly, as in the case of joining an LD module and a ferruled optical fiber by YAG welding.

Conventionally, in the optical axis alignment of this type, the quantity of light emitted from an optical component such as an LD module and incident upon a connecting end face of an optical fiber is measured by means of an optical power meter that is connected to the other end of the fiber, as the optical component and the optical fiber are relatively three-dimensionally moved, to thereby find out a relative position (optimum relative position) for a maximum light quantity.

In order to find out the optimum relative position of the optical component and the optical fiber in an XYZ-space with high accuracy, according to the conventional method described above, light quantity measurement should be made at a large number of relative positions in the XYZ-space, so that the optical axis alignment requires much time and labor. In case the longitudinal axis (optical axis) of the optical fiber is deviated from the Z-axis, in particular, the optimum relative positions in the X- and Y-axis directions shift as the relative position in the Z-axis direction varies, so that the optimum relative position in the XYZ-space cannot be found out with ease. Thus, the optimum relative position in the XYZ-space must be obtained by repeatedly measuring the light quantity while changing the relative positions in the X- and Y-axis directions every time the relative position in the Z-axis direction is changed.

If the number of points of light quantity measurement (relative positioning points involving light quantity measurement) is not good enough, local optimum values alone may be determined in the case where the light quantity distribution of the light emitted from the optical component is not represented by a unimodal function. In this case, the position for the maximum light quantity cannot be found out.

Although the problems on the optical axis alignment between a light emitting element and an optical fiber have been described above, the optical axis alignment between an optical fiber and a light receiving element or between optical fibers involves the same problems.

SUMMARY OF THE INVENTION

The object of the present invention is to provide an optical axis aligning method for an optical component and an apparatus therefor, capable of aligning the respective optical axes of the optical component and an optical fiber with speed, accuracy, and ease.

According to one aspect of the present invention, there is provided an optical axis aligning method for an optical component, in which the quantity of light emitted from an optical component or an optical fiber and incident upon the other is measured as the optical component and the optical fiber are positioned successively in a plurality of relative positions, to thereby obtain an optimum relative position for a maximum light quantity. This method comprises a step (a) of subjecting light quantity distribution on a given plane parallel to a connecting end face of the optical component or the optical fiber to quadric surface approximation in accordance with measured light quantities at a plurality of points on the given plane, thereby obtaining an optimum point on the given plane and a step (b) of subjecting light quantity distribution in the direction of the optical axis of the optical component or the optical fiber or in the direction of a given axis perpendicular to the given plane to quadratic function approximation in accordance with measured light quantities at a plurality of points in the direction of the optical axis or the given axis, thereby obtaining an optimum point in the direction of the optical axis or the given axis.

According to the conventional method, in optical axis alignment prior to the connection between an optical component and an optical fiber, a maximum light quantity point (optimum relative position) is searched for as the optical component and the optical fiber are successively relatively positioned at a large number of points in a three-dimensional space (XYZ-space). In other words, the optical component and the optical fiber are relatively positioned in the X-, Y-, and Z-axis directions at the same time.

In the optical axis aligning method of the present invention, the determination of the optimum point on the given plane (XY-plane) based on the quadric surface approximation of the light quantity distribution on the XY-plane and the determination of the optimum point in the direction of the optical axis or the given axis (Z-axis) based on the quadric function approximation of the light quantity distribution in the optical axis direction or the Z-axis direction are carried out independently of each other, so that, in accordance with the optimum point on the XY-plane and the optimum point in the optical axis direction or the Z-axis direction, the optimum relative position in the XYZ-space can be determined more speedily and easily than in the case of the conventional method. Further, optimum relative positions (optimum points) on the XY-plane and in the Z-axis direction can be accurately obtained by the quadric surface approximation and the quadric function approximation, so that the optimum relative position in the XYZ can be obtained accurately. The optimum relative position on the XY-plane and the optimum relative position in the Z-axis direction are represented by X-, Y-, and Z-coordinate values of a target position of the optical component or the optical fiber, for example. More generally, these positions are represented by two sets of X-, Y-, and Z-coordinate values that are indicative of the respective target relative positions of the optical component and the optical fiber.

Preferably, the step (a) includes a sub-step (a11) for subjecting light quantity distribution in the direction of a first axis, defining the given plane, to quadric function approximation in accordance with measured light quantities at a plurality of points in the first axis direction, a sub-step (a12) for subjecting light quantity distribution in the direction of a second axis, defining the given plane in conjunction with the first axis, to quadric function approximation in accordance with measured light quantities at a plurality of points in the second axis direction, and a sub-step (a13) for obtaining the optimum point on the given plane according to the quadric function approximation of the light quantity distribution in the first axis direction and the quadric function approximation of the light quantity distribution in the second axis direction.

According to this preferred method, the quadric surface approximation on the given plane can be carried out relatively easily, and the optimum relative position of the optical component and the optical fiber can be obtained with ease. Further, the accuracy of determination of the optimum point can be improved by increasing the numbers of measurement points in the first and second axis directions, and labor and time required by the determination of the optimum point can be reduced by lessening the measurement points in number. For example, measurement points in each of the first and second axis directions may be three. Moreover, one of the measurement points in the first axis direction may be used as one of the measurement points in the second axis direction so that the number of measurement points can be reduced.

Further preferably, the step (a) includes a sub-step (a14) for determining the optimum point on the given plane when the optimum point on the given plane is converged near a given one of the points in the first and second axis directions, and a sub-step (a15) for updating the setup of the points in the first and second axis directions and rerunning the sub-steps (a1) and (a2) when the optimum point on the given plane is not determined.

According to this preferred method, in determining the optimum point on the given plane by the quadric surface approximation, the required accuracy for the determination of the optimum point on the given plane is previously set in the form of an allowable value, so that the optimum point can be determined speedily and with the required accuracy.

Alternatively, the step (a) includes a sub-step (a21) for solving simultaneous equations obtained by substituting the measured light quantities at the points on the given plane individually into polynomial approximate expressions representing the light quantities on the given plane as functions of position coordinates on the given plane, thereby obtaining unknown coefficients of the respective terms of the polynomial approximate expressions, a sub-step (a22) for measuring the light quantity at the optimum point on the given plane obtained in the sub-step (a13), a sub-step (a23) for substituting the position coordinates of the optimum point on the given plane into the polynomial approximate expressions having the coefficients determined in the sub-step (a21), thereby obtaining an arithmetic value of the light quantity at the optimum point on the given plane, a sub-step (a24) for determining the optimum point on the given plane when the light quantity measured in the sub-step (a22) is converged near the arithmetic value obtained in the sub-step (a23), and a sub-step (a25) for updating the setup of the points in the first and second axis directions and rerunning the sub-steps (a1) and (a2) when the optimum point is not determined.

According to this preferred method, the obtained optimum point is accurate because it is determined when the difference between the measured light quantity at the optimum point, obtained by the quadric surface approximation, on the given plane and the arithmetic value of the light quantity at the optimum point is within its allowable range.

Preferably, the step (a) includes subjecting light quantity distributions on two given planes with different given axial positions to quadric surface approximation, thereby searching for the optical axis direction, and the step (b) includes subjecting light quantity distribution in the searched optical axis direction to quadric function approximation in accordance with measured light quantities at a plurality of points in the searched optical axis direction.

According to this preferred method, the optical axis direction is searched for according to the light quantity distributions on the two given planes, and the optimum point in the optical axis direction corresponding to the optimum relative position in the XYZ-space can be obtained with speed, accuracy, and ease from the light quantity distribution in the optical axis direction.

According to the preferred method described above, optimum points on the two given planes are individually obtained by the quadric surface approximation of the light quantity distributions on the two planes in the step (a), and the optimum point in the direction of the given axis is obtained by the quadric function approximation of the light quantity distribution in the given axis direction in the step (b), for example. Optimum point deviations in the directions of the two axes that define the given plane are obtained from the optimum points on the two given planes, and the optimum relative position of the optical component and the optical fiber is obtained according to the optimum point in the given axis direction, the two optimum point deviations, and the optimum point on at least one of the given planes. In the case of this example, the optimum point deviations in the respective directions (X- and Y-axis directions) of the two axes that define the given plane are obtained from the results of light quantity measurement on the two given planes that have different given axis direction positions, and the optimum point in the given axis direction (Z-axis direction) is obtained thereafter. Then, the optimum point on the XY-plane for the optimum position in the Z-axis direction is obtained according to the optimum point deviations and the optimum point on the one given plane. Thus, light quantity measurement need not be made to obtain the optimum point on the XY-plane every time the optical component and the optical fiber are relatively moved in the Z-axis direction, so that the optimum relative position in the XYZ-space can be obtained speedily and accurately. A straight line that connect the optimum points on the two given planes having the different Z-axis direction positions corresponds to the optical axis of the optical component or the optical fiber, so that a search for the optimum point in the Z-axis direction that involves the correction of the optimum point on the XY-plane based on the optimum point deviations is equivalent to a search for the optimum point in the optical axis direction. Thus, even in the case of obtaining the optimum point in the Z-axis direction while relatively moving the optical component and the optical fiber in the Z-axis direction with the component and the fiber supported in a manner such that the optical axis of the component or the fiber deviated from the given axis (Z-axis) perpendicular to the given plane (XY-plane) that extends parallel to the connecting face of the component or the fiber, the optimum point in the optical axis direction can be obtained speedily and accurately if the optimum point on the XY-plane having the Z-axis direction position concerned is corrected by means of the optimum point deviations after the optimum point in the Z-axis direction is determined.

An optical axis aligning method according to another aspect of the invention comprises a step (a) of obtaining an optimum point on a given plane parallel to a connecting end face of an optical component or an optical fiber by the simplex method in accordance with measured light quantities at a plurality of points on the given plane and a step (b) of subjecting light quantity distribution in the direction of the optical axis of the optical component or the optical fiber or in the direction of a given axis perpendicular to the given plane to quadric function approximation in accordance with measured light quantities at a plurality of points in the direction of the optical axis or the given axis, thereby obtaining an optimum point in the direction of the optical axis or the given axis.

According to the present invention, the optimum point (maximum light quantity point) on the given plane is obtained by using the simplex method. According to the simplex method, the maximum light quantity point can be satisfactorily obtained even in case the light quantity distribution of the light emitted from the optical component is not represented by a unimodal function or if it cannot be appropriately represented by quadric function approximation.

Preferably, according to the invention, the step (a) includes a sub-step (a11) for selecting a minimum light quantity point for a minimum light quantity, among a required number of first set points on the given plane, in accordance with measured light quantities at the first set points and selecting two other first set points than the minimum light quantity point, a sub-step (a12) for setting a required number of second set points on a straight line extending from the minimum light quantity point to the side opposite from the minimum light quantity point and passing through the middle point of a segment connecting the two first set points and selecting a maximum light quantity point for a maximum light quantity, out of the second set points, in accordance with measured light quantities at the second set points, a sub-step (a13) for selecting the maximum light quantity point as a new first set point in place of the minimum light quantity point, a sub-step (a14) for obtaining the newly selected first set point as an optimum point on the given plane when the respective lengths of segments connecting the adjacent new first set points are smaller than a maximum allowable value, and a sub-step (a15) for rerunning the sub-steps (a1) and (a2) when the respective lengths of the segments are not smaller than the maximum allowable value.

This preferred method is a concrete form of the simplex method that is used to determine the optimum point on the given plane. In this method, new set points for larger light quantities are repeatedly set in place of a minimum light quantity point, among other set points on the given plane. By doing this, a polygonal region that connects the set points is converged near the maximum light quantity point as it is shifted to the higher-light side on the given plane. Thus, according to this preferred method, the optimum point (maximum light quantity point) on the given plane can be obtained speedily and accurately.

Further preferably, the sub-step (a11) includes setting three of the first set points on the given plane, and said sub-step (a12) includes setting one second set point between the minimum light quantity point and the middle point of a segment connecting the remaining two first set point, on a straight line extending from the minimum light quantity point and passing through the middle point, and setting two second set points on the side remote from the minimum light quantity point with respect to the middle point.

According to this preferred method, the number of set points is minimized so that the optimum point on the given plane can be obtained more speedily and easily.

Preferably, the step (a) includes obtaining optimum points on two given planes with different given axial positions, thereby determining the optical axis direction, and the step (b) includes subjecting light quantity distribution in the determined optical axis direction to quadric function approximation in accordance with measured light quantities at a plurality of points in the determined optical axis direction.

According to this preferred method, the optimum point in the optical axis direction corresponding to the optimum relative position in the XYZ-space can be obtained speedily and accurately by the quadric function approximation of the light quantity distribution in the optical axis direction. Even if a determination of the optimum point in the Z-axis direction is made with the optical axis of the optical component or the optical fiber deviated from the given axis (Z-axis), the optimum point in the optical axis direction can be obtained with speed and accuracy, equivalently.

According to still another aspect of the invention, there is provided an optical axis aligning apparatus for an optical component, in which the quantity of light emitted from the optical component or an optical fiber and incident upon the other is measured as the optical component and the optical fiber are positioned successively in a plurality of relative positions, to thereby obtain an optimum relative position for a maximum light quantity. This optical axis aligning apparatus comprises a first stage movable along a first axis, a second stage supporting the optical component or the optical fiber and supported on the first stage for movement along a second axis perpendicular to the first axis, a third stage supporting the optical fiber or the optical component and movable along a third axis perpendicular to the first and second axes, a light quantity measurer for measuring the quantity of light emitted from the optical component or the optical fiber and incident upon the other, and an arithmetic drive unit for obtaining an optimum point on a given plane defined by the first and second axes by the simplex method or by quadric surface approximation of light quantity distribution on the given plane, in accordance with measured light quantities at a plurality of points on the given plane, obtaining an optimum point in the direction of the third axis by quadric function approximation of light quantity distribution in the direction of the third axis, in accordance with measured light quantities at a plurality of points in the direction of the third axis, and suitably driving the first, second, and third stages so that the optical component and the optical fiber are relatively positioned on the optimum points on the given plane and in the direction of the third axis.

In the optical axis aligning apparatus of the invention, the arithmetic drive unit obtains the optimum point on the given plane by the simplex method or by the quadric surface approximation of the light quantity distribution on the given plane (XY-plane), and obtains the optimum point in the direction of the third axis by the quadric function approximation of the light quantity distribution in the direction of the third axis (Z-axis direction), so that the optimum relative position in the XYZ-space can be obtained speedily and accurately. The first, second, and third stages of the optical axis aligning apparatus are driven to position the optical component and the optical fiber in the optimum relative position, whereby the optical axis alignment is completed.

Preferably, the arithmetic drive unit obtains optimum points on two given planes with different third-axis-direction positions and deviations between optimum points in the first and second axis directions, and corrects the optimum point on the given plane with the optimum point deviations as the third stage moves in the direction of the third axis.

According to this preferred apparatus, the optimum point on the given plane (XY-plane) having the Z-axis direction position corresponding to the optimum point in the third axis direction (Z-axis direction) is obtained according to the optimum point deviations and the optimum point on the one given plane, so that the optimum relative position in the XYZ-space can be obtained speedily and accurately.

According to the present invention, the respective optical axes of an optical fiber and various optical elements, such as light emitting elements, light receiving elements, etc., and those of optical fibers can be aligned with one another with speed, accuracy, and ease.

DETAILED DESCRIPTION OF THE PREFERRED EMBODIMENTS

The following is a description of an optical axis aligning apparatus according to a first embodiment of the present invention.

Figure 1:
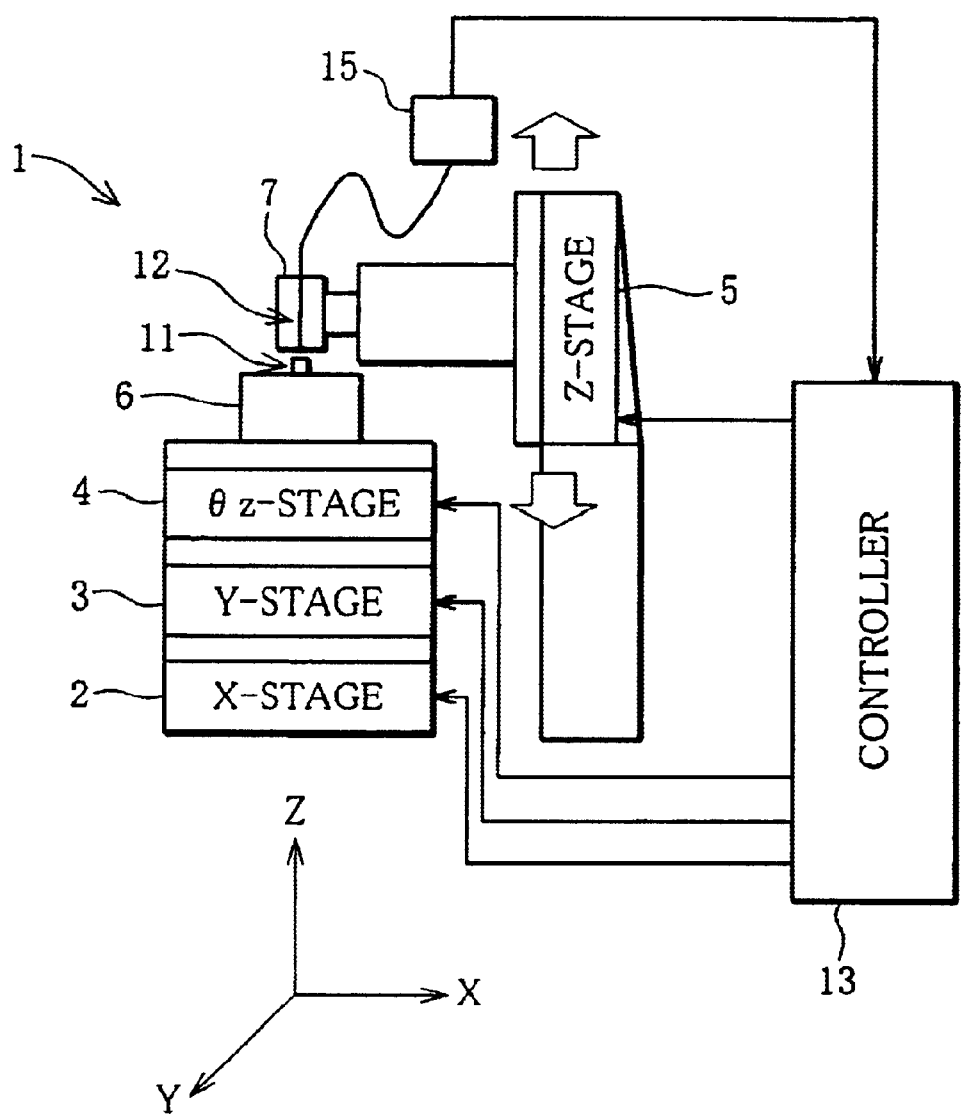
FIG. 1 is a diagram schematically showing an optical axis aligning apparatus according to any of first to third embodiments of the present invention.

As shown in FIG. 1, an optical axis aligning apparatus 1 comprises an X-stage 2 movable in an X-axis direction (direction of a first axis) with respect to a platform (not shown), a Y-stage 3 supported on the X-stage 2 and movable in a Y-axis direction (direction of a second axis) with respect to the X-stage, and a θz-stage 4 supported on the Y-stage 3 and capable of horizontal revolution with respect to the Y-stage. A work holder 6 for supporting an optical component, such as a laser diode module (LD module) 11, is supported on the upper surface of the θz-stage 4. The Y-stage 3 and the θz-stage 4 constitute a second stage that supports the optical component and is movable with respect to the X-stage (first stage).

In the optical axis aligning apparatus 1, a Z-stage (third stage) 5 is supported on the platform for movement in a Z-axis direction (direction of a third axis). One end portion of and optical fiber, e.g., a ferruled optical fiber 12, is supported by means of a work bearer 7 that is provided on a horizontal extension of the Z-stage 5. The other end of the optical fiber 12 is connected to an optical power meter 15, which serves to measure the quantity of light emitted from a laser diode element (not shown) in the LD module 11 toward the fiber 12. The X-stage 2, Y-stage 3, θz-stage 4, and Z-stage 5 are each provided with a position sensor (not shown) for detecting the shifted position or rotational position of the stage. The respective outputs of the position sensors and the optical power meter 15 are supplied to an arithmetic drive unit 13. The drive unit 13 is composed of a controller that includes a computer, memory, input and output circuits (not shown), etc., for example. The unit 13 has an arithmetic function to determine the respective shifted positions or rotational positions of the stages 2 to 5 (i.e., a target shifted and rotational position of the LD module 11 and a target shifted position of the lower end portion of the optical fiber 12), in accordance with the respective outputs of the position sensors and the optical power meter, and a driving function to drive the stages 2 to 5 to the target positions.

In the optical axis aligning apparatus according to the present embodiment, the stages 2 to 5 are drivingly controlled so that the optical axis of the LD module 11, which is supported on the work holder 6 of the θz-stage 4, and the optical axis of the lower end portion of the optical fiber 12, which is supported by means of the work bearer 7, are aligned with each other. In this state of alignment, a sleeve (not shown) of the LD module 11 and a ferrule (not shown) on the lower end portion of the optical fiber 12 are laser-welded to each other by means of a YAG laser apparatus (not shown).

The optical axis aligning apparatus of the present embodiment is characterized in that a maximum light quantity point is obtained by repeatedly carrying out quadric function approximation (e.g., three-point alignment) in the Z-axis direction after effecting quadric surface approximation (e.g., five-point alignment) for light quantity on a plane (XY-plane) perpendicular to the Z-axis direction.

The following is a description of the operation of the optical axis aligning apparatus 1.

Figure 2:
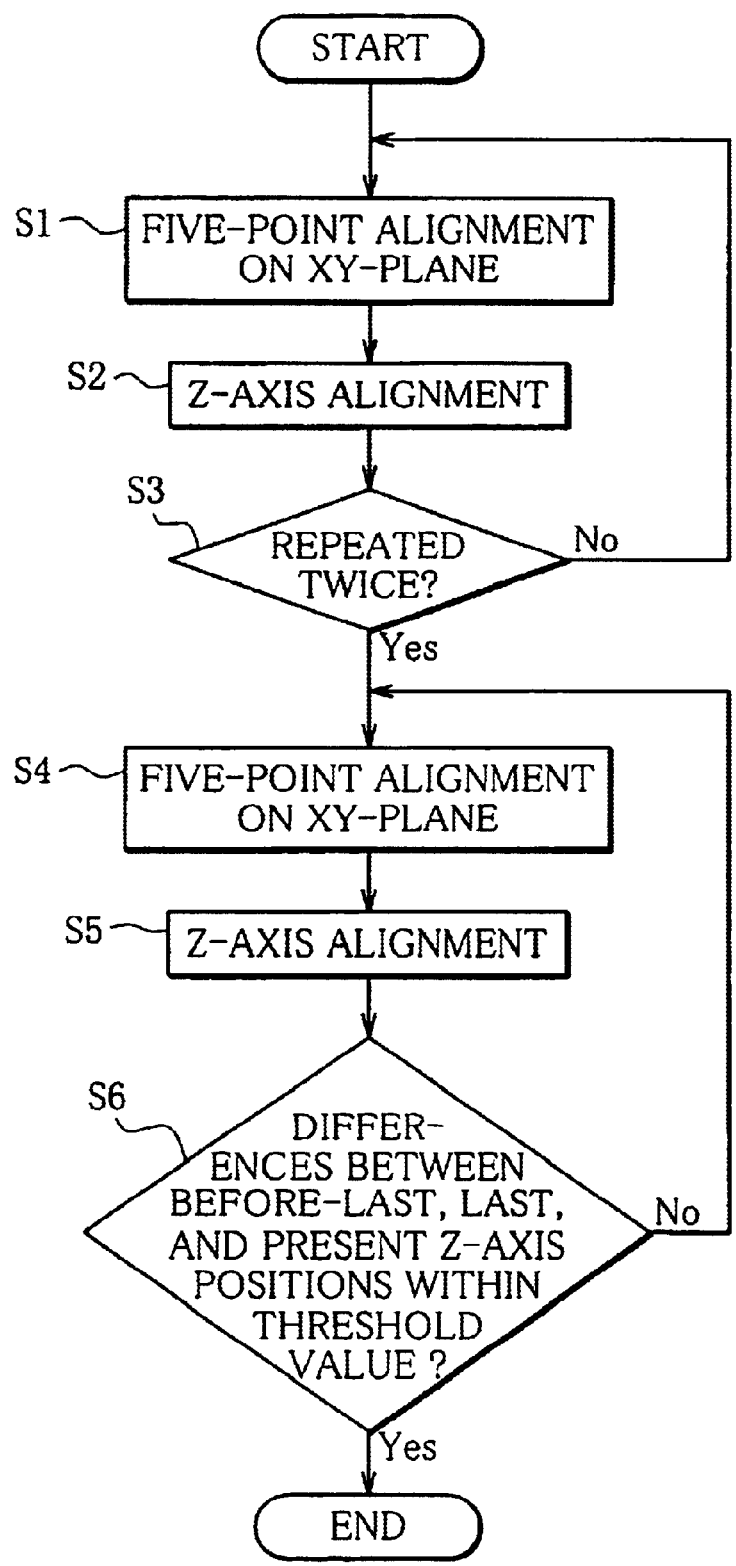
FIG. 2 is a flowchart of a fine alignment routine carried out under the control of a controller shown in FIG. 1.

The diameter of an observable range for light emitted from the LD module 11 is as small as about 100 μm. In the optical axis alignment (alignment) according to the present embodiment, "rough alignment" such that a corresponding one or ones of the stages 2 to 5 of FIG. 1 are driven within a range of several millimeters to search for the light roughly is first carried out for the X-, Y-, and Z-axes by, for example, the conventional spiral alignment or mountaineering alignment method. Then, a fine alignment routine shown in FIG. 2 is carried out under the control of the controller 13 of the optical axis aligning apparatus 1, in order to search for the position for the maximum light quantity.

Figure 3:
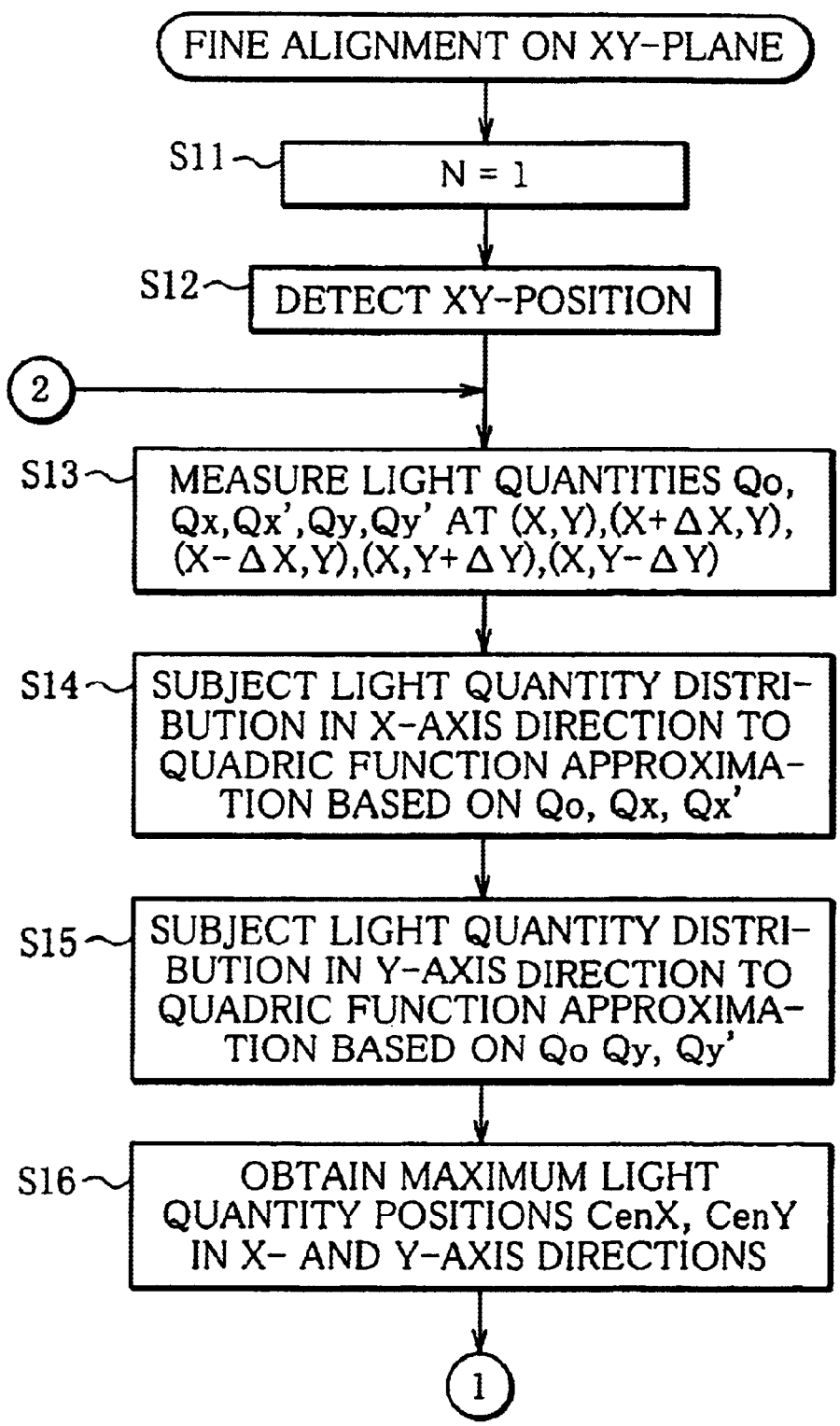
FIG. 3 is a part of a flowchart of a fine alignment subroutine for an XY-plane, constituting a part of a fine alignment routine according to the first embodiment of the invention.
Figure 4:
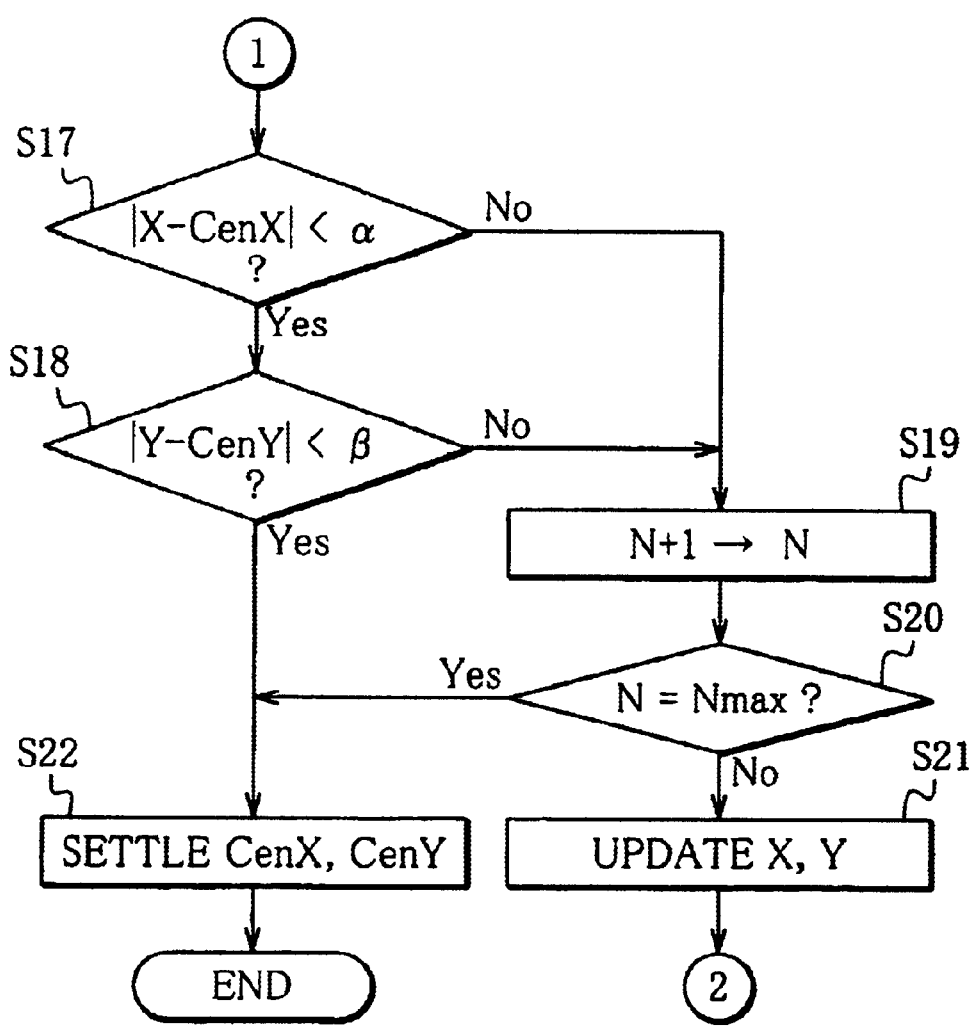
FIG. 4 is the remainder of the flowchart of the fine alignment subroutine continued from FIG. 3.

In Step S1 for the fine alignment routine, a fine alignment subroutine for the XY-plane shown in FIGS. 3 and 4 is executed. More specifically, in this fine alignment subroutine, a parameter N that is used to determine the frequency of repetition of this subroutine is set at its initial value "1" (Step S11), and the current XY-coordinate position of the LD module 11 is detected from position sensor outputs for the X- and Y-stages 2 and 3 (Step S12). Then, the X- or Y-stage 2 or 3 is driven to position the LD module 11 successively in four positions (X+ΔX, Y), (X−ΔX, Y), (X, Y+ΔY) and (X, Y−ΔY) that are deviated from the current XY-position by margins corresponding to given X- and Y-direction movements ΔX and ΔY in the positive and negative directions, and light quantities Q0, Qx, Qx' and Qy' in the current position (X, Y) and the four deviated positions are measured by means of the optical power meter 15 (Step S13). If necessary, the light quantity at the point (X, Y) is measured again, and the average, (Q0+Q0')/2, of the light quantities Q0' and Q0 is regarded as the light quantity Q0 at the point (X, Y).

Then, the light quantity distribution in the X-axis direction is subjected to quadric function approximation based on the light quantities Q0, Qx and Qx' at three points (X, Y), (X+ΔX, Y) and (X−ΔX, Y) (Step S14), and the light quantity distribution in the Y-axis direction is subjected to quadric function approximation based on the light quantities Q0, Qy and Qy' at another three points (X, Y), (X, Y+ΔY) and (X, Y−ΔY) (Step S15). Further, an X-direction position CenX for the maximum light quantity in the X-axis direction is obtained from a quadric function that is obtained in Step S14 and approximates the light quantity distribution in the X-axis direction, and a Y-direction position CenY for the maximum light quantity in the Y-axis direction is obtained from a quadric function that is obtained in Step S15 and approximates the light quantity distribution in the Y-axis direction (Step S16).

Whether or not the absolute value of the difference between a current reference X-coordinate value X and an optimum X-coordinate value CenX is greater than an allowable value (convergent threshold value) α is determined, and whether or not the absolute value of the difference between a current reference Y-coordinate value Y and an optimum Y-coordinate value CenY is greater than an allowable value β that is identical with or different from the allowable value α is determined (Steps S17 and S18). If the decision in Step S17 or S18 is negative, a fine alignment frequency N is incremented by "1" (Step S19), and whether or not a maximum repetition frequency Nmax is reached by the incremented frequency N is determined (Step S20). If the maximum repetition frequency for the fine alignment is not attained, the current XY-position is updated (Step S21), and the program returns to Step S13, whereupon the aforesaid fine alignment is rerun.

If the absolute value of the difference between the X-and Y-direction values becomes smaller than the allowable values α and β, thereafter, the X-coordinate value CenX and the Y-coordinate value CenY then obtained are determined as the XY-position for the maximum light quantity point (Step S22), whereupon the fine alignment subroutine for the XY-plane shown in FIGS. 3 and 4 terminates.

Figure 5:
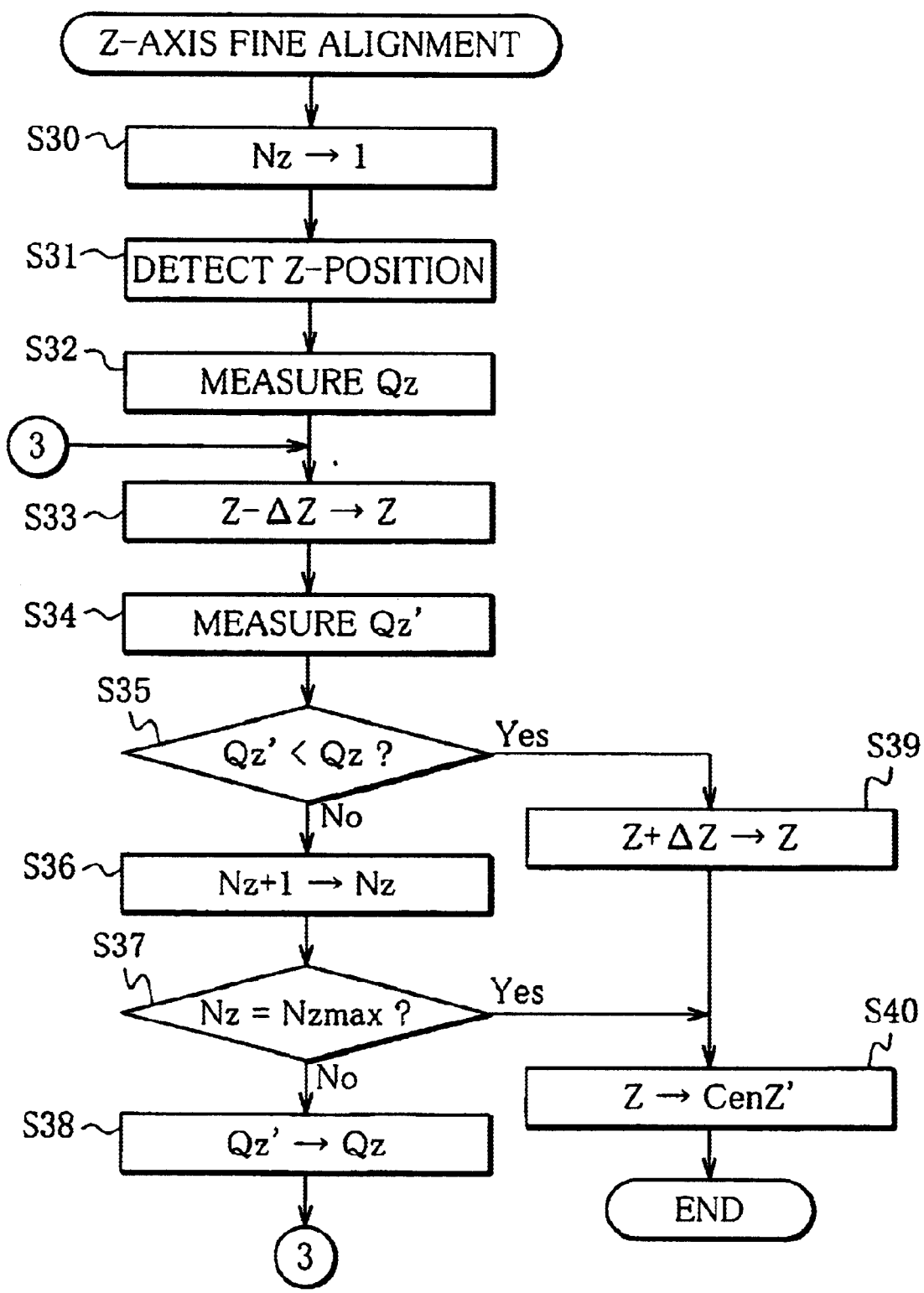
FIG. 5 is a flowchart of a fine alignment subroutine for the Z-axis, constituting a part of the fine alignment routine of FIG. 2.

After the maximum light quantity point or optimum point (CenX, CenY) on the XY-plane is obtained in this manner, the fine alignment procedure proceeds to Step S2 of FIG. 2. In Step S2, a fine alignment subroutine for the Z-axis shown in FIG. 5 is carried out. More specifically, a parameter Nz that is used to determine the frequency of repetition of the Z-axis fine alignment subroutine is set at its initial value "1" (Step S30), the current Z-coordinate position of the optical fiber 12 is detected from a position sensor output for the Z-stage 5 (Step S31), and a light quantity Qz in this Z-position is measured by means of the optical power meter 15 (Step S32).

Then, the Z-stage 5 is driven to position the optical fiber 12 in a position (Z−ΔZ) that is deviated from the current Z-position in the negative direction (Step S33), and a light quantity Qz' in this Z-position is measured (Step S34). If the light quantity Qz' is not smaller than the light quantity Qz (Step S35), the parameter Nz is incremented by "1" (Step S36), and whether or not a maximum repetition frequency Nzmax is reached by the incremented parameter Nz is determined (Step S37). If the decision in this step is negative, the light quantity Qz' is stored as the light quantity Qz, and Step S33 and its subsequent steps of procedure are then repeated so that the optical fiber 12 is gradually brought close to the LD module 11.

If it is concluded in Step S35 that the light quantity Qz' is smaller than the last light quantity Qz, thereafter, the optical fiber 12 is positioned in a position that is shifted from the current Z-direction position by a movement ΔZ in the positive direction (Step S39). This position Z is stored as a tentative maximum light quantity point CenZ' in the Z-axis direction (Step S40), whereupon the fine alignment subroutine for the Z-axis or Step S2 of FIG. 2 terminates.

Then, in the fine alignment routine of FIG. 2, whether or not the fine alignment processes of Steps S1 and S2 are repeated given times, e.g., twice, in this routine is determined (Step S3). If the decision in this step is negative, the program returns to Step S1.

After Steps S1 and S2 are repeated twice, the five-point alignment (quadric surface approximation) for the XY-plane is carried out in Step S4, in the same manner as in the case of Step S1. In the five-point alignment of Step S4, however, the movements ΔX and ΔY on the XY-plane and the convergent threshold values α and β are made smaller than in the case of Step S1 so that the maximum light quantity point on the XY-plane can be obtained more accurately.

Figure 6:
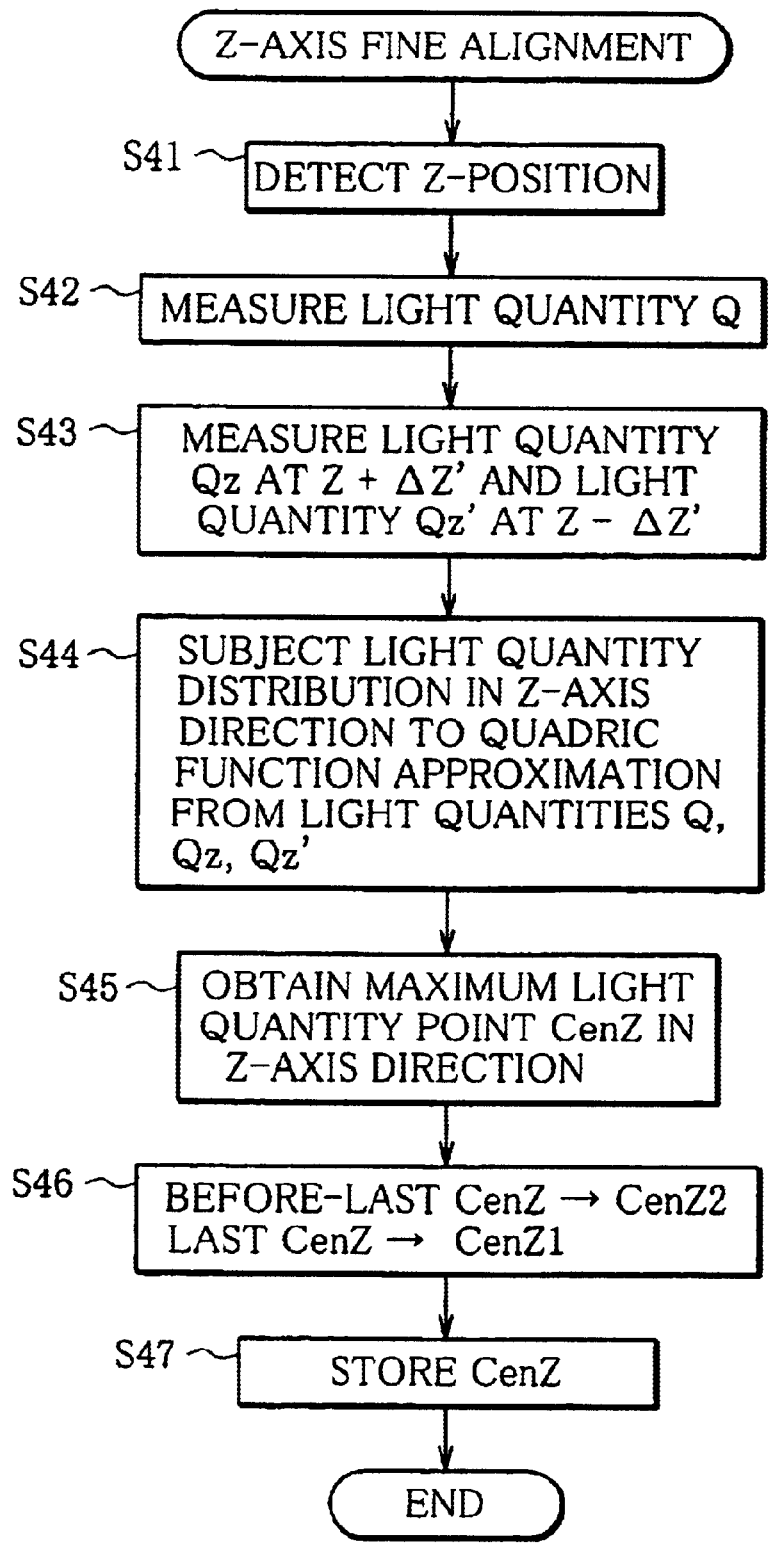
FIG. 6 is a flowchart of another fine alignment subroutine for the Z-axis, constituting a part of the fine alignment routine of FIG. 2.

Then, in Step S5, a fine alignment subroutine for the Z-axis shown in FIG. 6 is carried out to obtain the maximum light quantity point on the Z-axis. More specifically, the current X-axis coordinate value Z of the optical fiber 12 (corresponding to the position CenZ' in Steps S39 and S40 of FIG. 5) is detected (Step S41), and the light quantity Q in this Z-position is measured (Step S42). Subsequently, the Z-stage 5 is driven to position the optical fiber 12 successively in Z-direction positions Z+ΔZ' and Z−ΔZ', and the light quantities Qz and Qz' in these positions are measured (Step S43). If necessary, the light quantities are measured again with the optical fiber 12 positioned again in the initial coordinate position Z, and the average with the first light quantity Q is taken. Then, the light quantity distribution in the Z-axis direction is subjected to quadric function approximation based on the light quantities Q, Qz and Qz' in the coordinate positions Z, Z+ΔZ' and Z−ΔZ' (Step S44), and a maximum light quantity point CenZ in the Z-axis direction is obtained in accordance with this quadric function (Step S45). If the before-last point CenZ remains, it is stored as CenZ2. If the last point CenZ remains, it is stored as CenZ1 (Step S46). Further, the present point CenZ is stored (Step S47), whereupon the subroutine concerned terminates.

Subsequently, the program returns to the fine alignment routine of FIG. 2. In Step S6, the present value CenZ, last value CenZ1, and before-last value CenZ2 for the maximum light quantity point in the Z-axis direction are read from the memory. If the difference between maximum and minimum values is within the convergent threshold value, the fine alignment routine of FIG. 2 terminates. If not, the program returns to Step S4. Although not shown in FIG. 2, a determination as to the frequency of repetition is made between Steps S6 and S4. When the frequency of repetition of Steps S4 and S5 reaches its maximum value, the fine alignment routine of FIG. 2 terminates.

Thus, the maximum light quantity point in an XYZ-space is obtained by repeating the five-point alignment for the XY-plane and the three-point alignment for the Z-axis. According to this method, the maximum light quantity point can be securely detected at a lower frequency of stage operation than in the conventional method, so that the tact time for optical axis alignment can be shortened.

The optical axis aligning apparatus according to the first embodiment may be modified variously.

Figure 7:
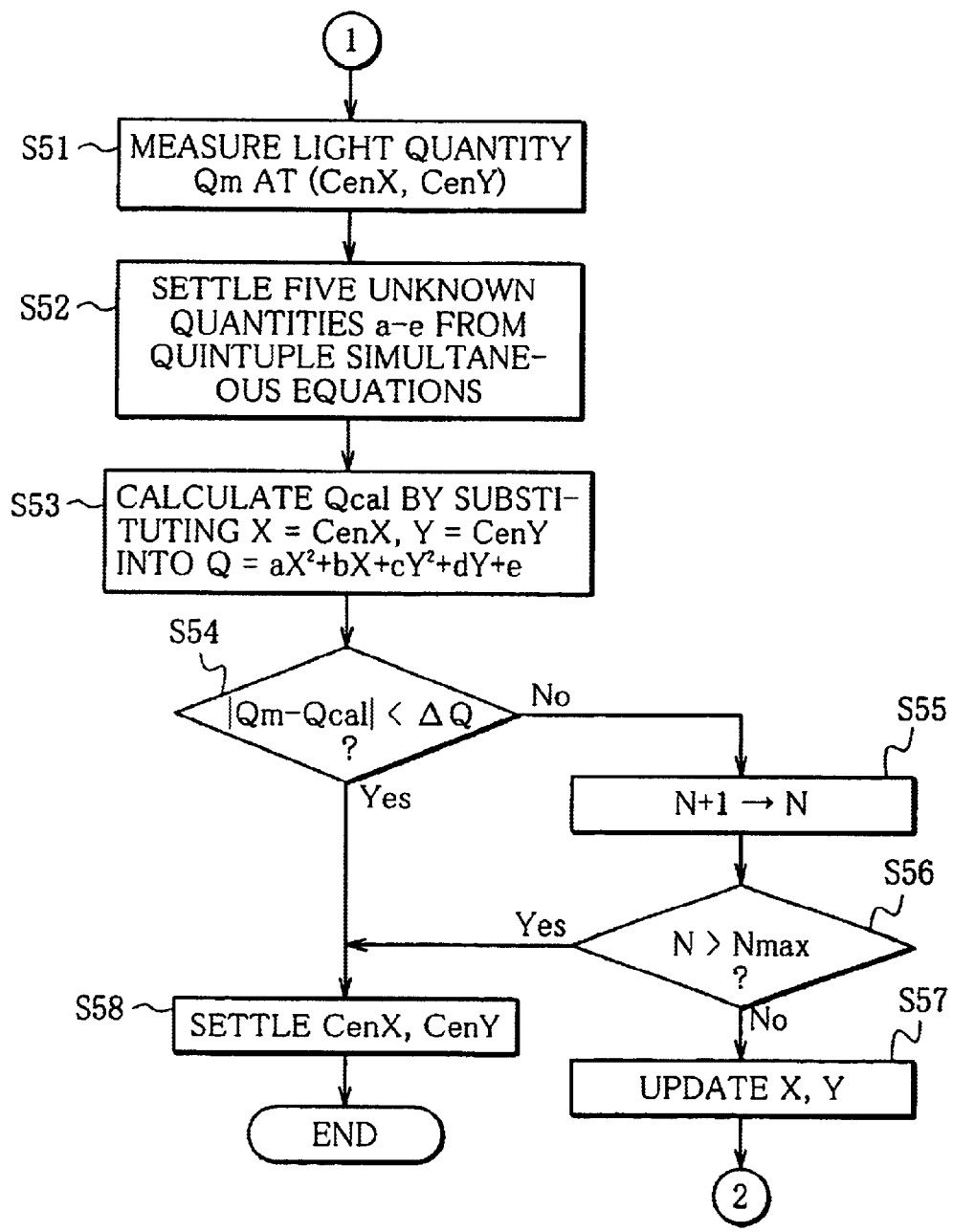
FIG. 7 is a part of a flowchart of a fine alignment subroutine for the XY-plane according to a modification of the first embodiment of the invention.

FIG. 7 shows a part of a fine alignment subroutine for the XY-plane carried out by means of a controller of an optical axis aligning apparatus according to a modification of the first embodiment.

According to the first embodiment, the optimum point is determined when an optimum point (CenX, CenY) on the XY-plane obtained according to the measured light quantities at five points on the XY-plane are converged near the reference coordinate value (X, Y). According to this modification, however, the light quantity on the optimum point (CenX, CenY), which point is obtained from the measured light quantities at the five point, is actually measured, the light quantities at the optimum point is calculated according to the following Equation (1), and the optimum point is determined when the difference between the measured value and the calculated value is within the convergent threshold value.

$$Q = aX^2 + bX + cy^2 + dY + e. \tag{1}$$

Equation (1) is used for the quadric surface approximation of the light quantity distribution on the XY-plane. In Equation (1), Q, X and Y are the light quantity, X-axis coordinate value, and Y-axis coordinate value, respectively, and a to e are coefficients.

In the fine alignment subroutine for the XY-plane according to this modification, the processes of Steps S11 to S16 of FIG. 3 are carried out, whereupon the maximum light quantity point (CenX, CenY) on the XY-plane is obtained. Then, Step S51 of FIG. 7 and its subsequent steps of procedure for fine alignment are executed.

More specifically, a light quantity Qm at the maximum light quantity point (CenX, CenY), which is obtained in Step S16 of FIG. 3, is measured by means of the optical power meter 15 with the LD module 11 positioned on the maximum light quantity point (Step S51). Then, the coordinate value (X, Y), (X+ΔX, Y), (X−ΔX, Y), (X, Y+ΔY) or (X, Y−ΔY) detected in Step S12 or S13 of FIG. 3 and the measured light quantity Q0, Qx, Qx', Qy or Qy' at each point are successively substituted into Equation (1). By doing this, quintuple simultaneous equations with the five coefficients a to e serving as unknown quantities are set up, and they are solved to obtain the coefficients a to e (Step S52). Then, the five coefficients a to a and the X- and Y-axis coordinate values CenX and CenY at the maximum light quantity point obtained in Step S16 are substituted into Equation (1), whereby an arithmetic value Qcal of the light quantity at the maximum light quantity point (CenX, CenY) is calculated (Step S53).

Then, whether or not the absolute value of the difference between the measured light quantity Qm obtained in Step S51 and the arithmetic value Qcal is smaller than a convergent threshold value ΔQ is determined (Step S54). If the decision in this step is negative, Steps S55, S56 and S57 that correspond to the Steps S19, S20 and S21 of FIG. 4 are successively carried out, whereupon the program returns to Step S11 of FIG. 3.

When the maximum light quantity point (CenX, CenY) is converged or when the present subroutine is carried out to its maximum repetition frequency, thereafter, the X- and Y-axis coordinate values CenX and CenY for the then maximum light quantity point are determined (Step S58).

According to this modification, the optimum point is finally determined when the difference between the measured light quantity Qm at the optimum point (CenX, CenY) on the XY-plane, which is obtained by quadric surface approximation, and the arithmetic value Qcal of the light quantity at the optimum point is within its allowable range. Thus, the obtained optimum point is accurate.

An optical axis aligning apparatus according to a second embodiment of the invention will now be described with reference to FIGS. 8 to 10.

According to the first embodiment, fine alignment for the XY-plane is based on quadric surface approximation. According to the second embodiment, in contrast with this, fine alignment for the XY-plane is based on the simplex method. The first and second embodiments are identical with respect to other particulars, and a description of those details is omitted.

Figure 8:
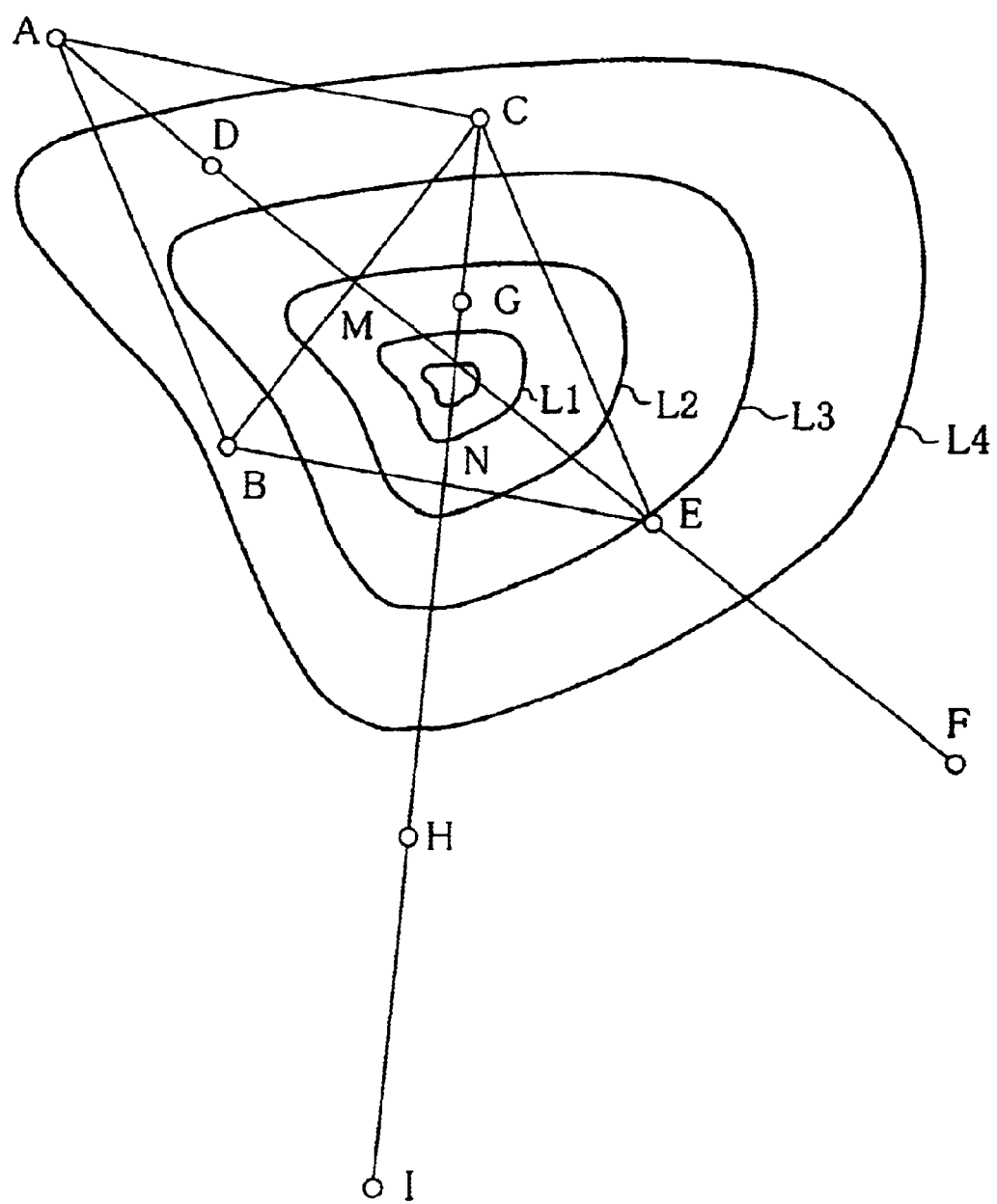
FIG. 8 is a conceptual diagram for illustrating fine alignment for the XY-plane based on the simplex method according to a second embodiment of the invention.

The light quantity distribution on the emission end face (corresponding to the XY-plane) of the optical component or the optical fiber is represented by contour-shaped loops, e.g., loops L1 to L4 shown in FIG. 8. In FIG. 8, the light quantity is larger on the side close to the central loop L1 and smaller on the side close to the outermost loop L4.

In determining the maximum light quantity point on the XY-plane by the simplex method, new set points for larger light quantities are repeatedly set in place of a minimum light quantity point, among other evaluation points (set points) on the XY-plane. By doing this, a polygonal region that connects the set points (equilateral-triangle region that connects three evaluation points in FIG. 8) is converged near the maximum light quantity point as it is shifted to the higher-light side on the XY-plane. Thus, the maximum light quantity point on the XY-plane can be obtained speedily and accurately.

Figure 9:
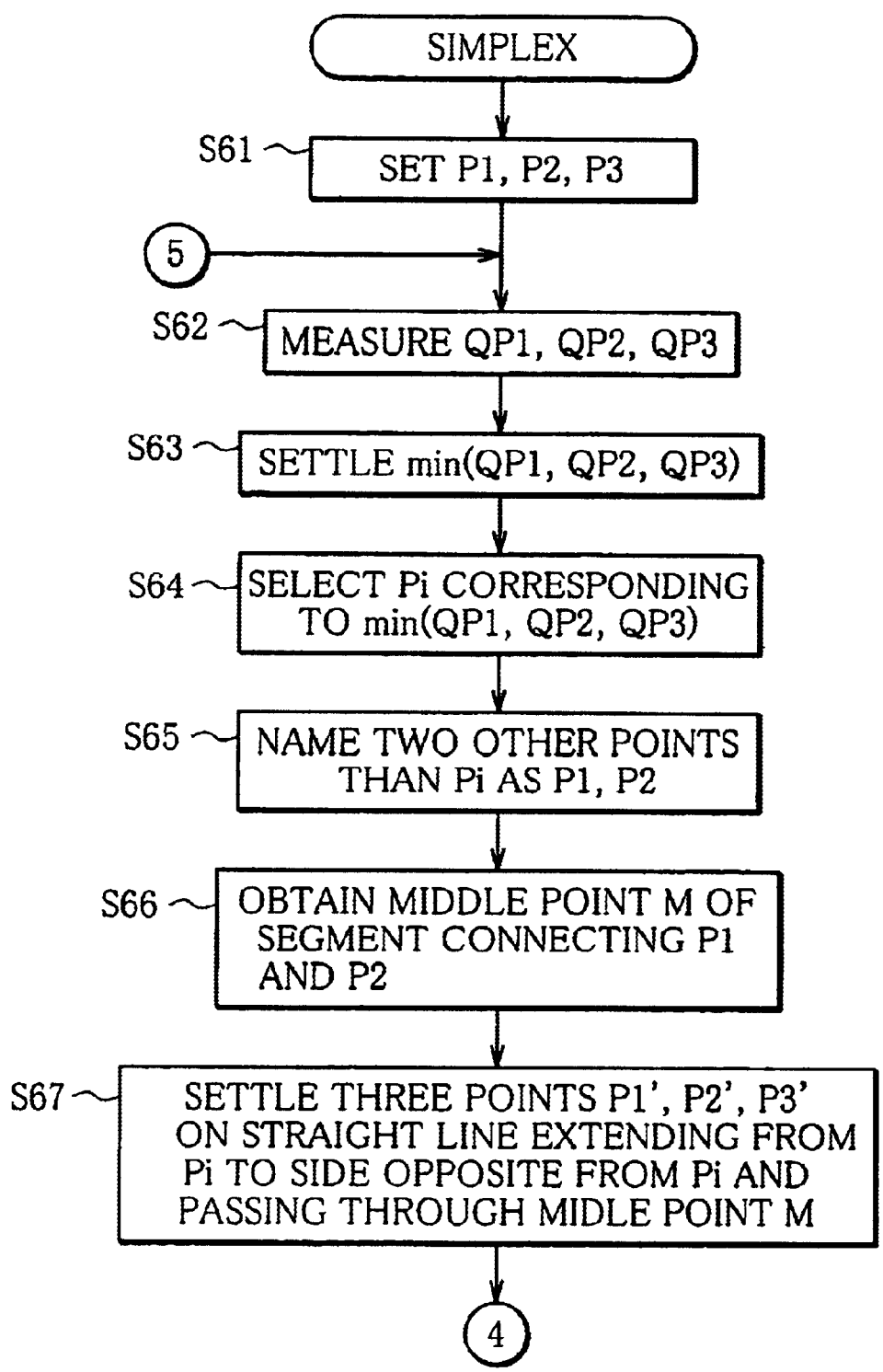
FIG. 9 is a part of a flowchart of a fine alignment subroutine for the XY-plane based on the simplex method.
Figure 10:
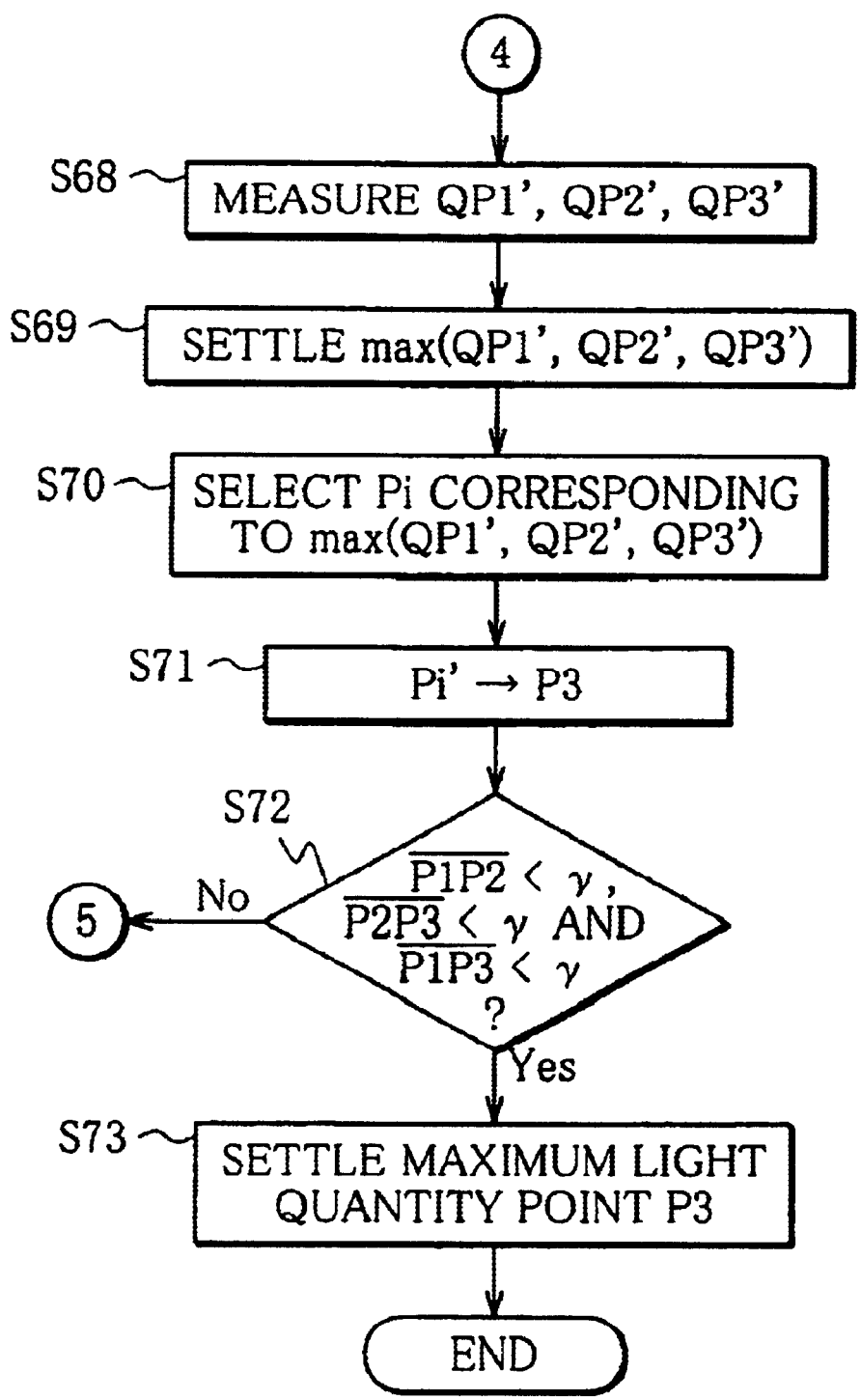
FIG. 10 is the remainder of the flowchart continued from FIG. 9.

Referring now to FIGS. 9 and 10, there will be described steps of procedure for the fine alignment on the XY-plane based on the simplex method that is executed under the control of the controller of the optical axis aligning apparatus.

In a fine alignment subroutine shown in FIGS. 9 and 10, points A, B and C in FIG. 8, for example, are selected as three optional evaluation points P1, P2 and P3 on the XY-plane (Step S61), the LD module 11 is positioned successively at these evaluation points, and light quantities QP1, QP2 and QP3 at the evaluation points P1, P2 and P3 (points A, B and C in this case) are measured (Step S62). Further, a minimum value min(QP1, QP2, QP3) of these light quantities is determined (Step S63), and an evaluation point Pi (corresponding to the point A of FIG. 8) corresponding to the minimum light quantity is selected (Step S64).

Two other points than the minimum light quantity point Pi are named P1 and P2 (Step S65), and a middle point M of a segment that connects the points (e.g., points B and C of FIG. 8) is obtained (Step S66). Further, three points P1', P2' and P3' are determined on a straight line that extends from the minimum light quantity point Pi (point A of FIG. 8) to the side opposite from the point Pi and passes through the middle point M (Step S67).

According to the present embodiment, one point corresponding to the middle point of a segment that connects the minimum light quantity point Pi and the middle point M is set on the aforesaid straight line. Set on the side remote from the minimum light quantity point Pi with respect to the middle point are a point that is situated at a distance equal to the distance between the two points Pi and M and another point that is situated at another equal distance from the second point. More specifically, points D, E and F are set in the manner shown in FIG. 8. The respective lengths of segments that connect the point A and the points D, E and F are given by AD=0.5AM, AE=2AM, and AF=3AM, respectively.

Then, as the LD module 11 is positioned at the three points P1', P2' and P3' determined in Step S67, light quantities QP1', QP2' and QP3' at these three points are measured in succession (Step S68), and a maximum value max(QP1', QP2', QP3') of the measured light quantities is obtained (Step S69). Further, a point Pi' (corresponding to point the point E of FIG. 8) corresponding to the maximum light quantity is selected (Step S70).

Then, the point Pi' is set as the point P3 (Step S71), and whether or not the respective lengths of segments P1P2, P2P3 and P1P3 that connect the point P3 and the adjacent points P1 and P2 set in Step S65 are smaller than a convergent threshold value $\gamma0$ is determined (Step S72). If the decision in this step is negative, Step S62 of FIG. 9 and its subsequent steps of procedure for fine alignment are rerun. A new light quantity measurement region is set by selecting a point for the maximum measured light quantity, among three points set on a straight line that extends from the point for the minimum measured light quantity out of the initially set evaluation points, in place of the minimum light quantity point. Based on this new light quantity measurement region (equilateral triangle BCE in the case of FIG. 8), fine alignment operation is carried out. In the case of FIG. 8, three points G, H and I are set on a straight line that extends from the point C for the minimum light quantity, out of the three evaluation points B, C and E, and passes through a middle point N of a segment BE. The point G for the maximum light quantity is selected in place of the point C, and the new evaluation points B, E and G are set.

Thus, the distances between the three evaluation points are shortened every time new evaluation points are set, and are converged in the end. In this case, the evaluation point P3 for the maximum light quantity, among the evaluation points P1, P2 and P3, is determined as the maximum light quantity point (Step S73).

By using the simplex method as one of multivariable optimization methods in this manner, the maximum light quantity point on the XY-plane can be accurately obtained even in case the light quantity distribution of the LD module 11 is not represented by a unimodal function or if it cannot be satisfactorily represented by quadric function approximation.

If the light quantity distribution on the XY-plane can be regarded as concentric, four-point alignment may be utilized such that the maximum light quantity point from the results of light quantity measurement at four points. Alternatively, scan alignment may be used such that the maximum light quantity point is found out while the light quantity is measured as the optical component, e.g., the LD module, is moved, and that the component is positioned at maximum light quantity point after the movement. Thus, the tact for the detection of the maximum light quantity point on the XY-plane can be shortened further.

Figure 11:
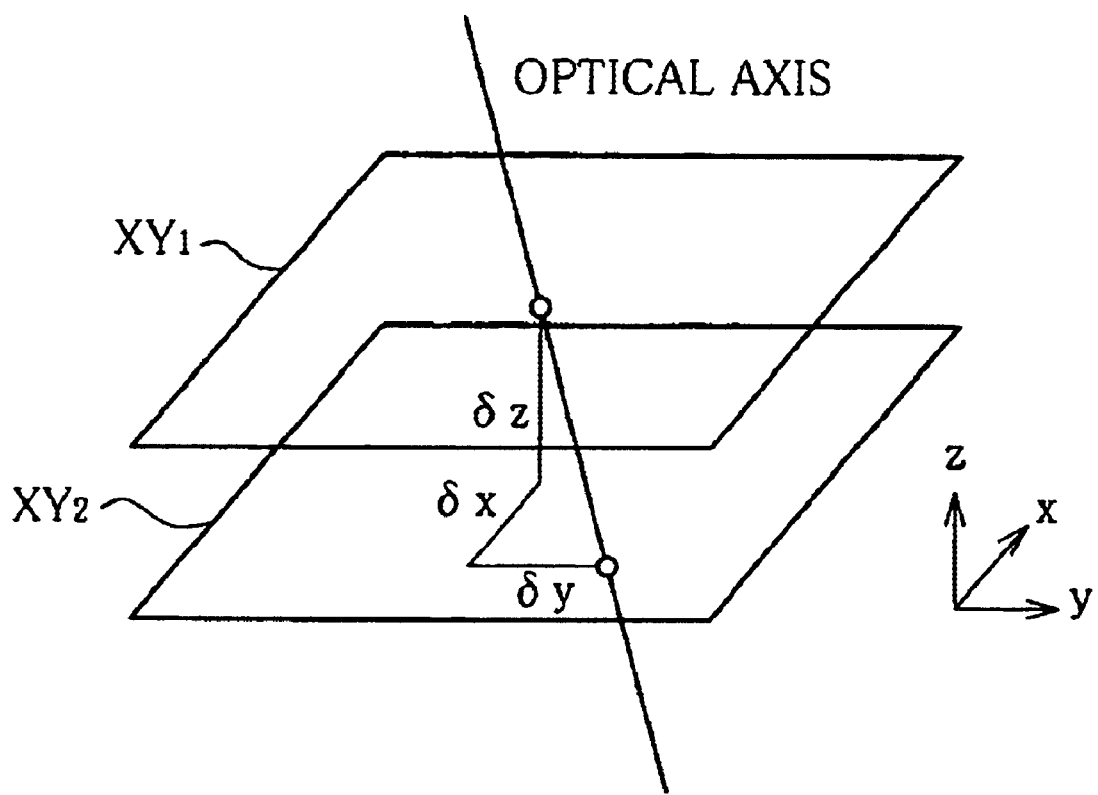
FIG. 11 is a conceptual diagram for illustrating fine alignment in the optical axis direction according to a third embodiment of the invention.

An optical axis aligning apparatus according to a third embodiment of the invention will now be described with reference to FIGS. 11 and 12.

Basically, this embodiment is arranged in the same manner as the first and second embodiments. More specifically, rough alignment is followed by alignment for the XY-plane (FIG. 2) that is carried out by, for example, quadric surface approximation (five-point alignment) or the simplex method, and alignment for the Z-axis is carried out by quadric function approximation. Besides this, according to the third embodiment, alignment in the optical axis direction is carried out equivalently by correcting the maximum light quantity point on the XY-plane. Depending on the way of supporting the optical fiber 12, the optical axis of the optical fiber may be deviated from the Z-axis at the supporting-side end portion of the optical fiber, as shown in FIG. 11. Due to this deviation between the optical axis and the Z-axis, the accurate maximum light quantity point cannot be obtained with speed, in some cases.

Figure 12:
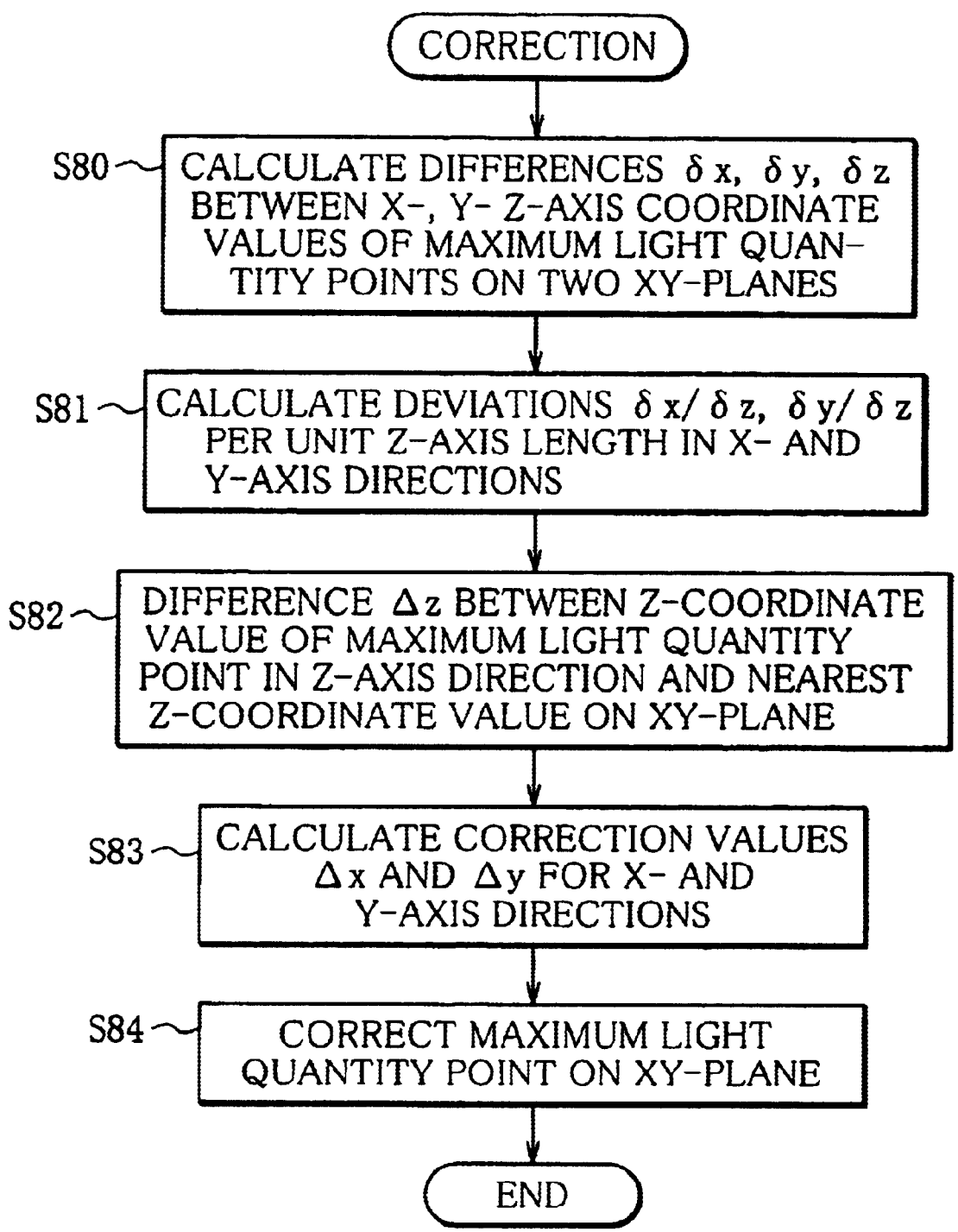
FIG. 12 is a flowchart of a maximum light quantity point correction subroutine according to the third embodiment.

According to the present embodiment, a correction subroutine shown in FIG. 12 is carried out following Step S6 in the fine alignment routine of FIG. 2, errors in the determination of the maximum light quantity point for the XY-plane that are attributable to the deviation between the optical axis and the Z-axis are removed, whereby the alignment in the optical axis direction is effected equivalently.

Although the maximum light quantity point on the one XY-plane and the maximum light quantity point in the Z-axis direction are finally determined in the fine alignment routine of FIG. 2, maximum light quantity points for a plurality of XY-planes are obtained in this process of determination. According to the present embodiment, therefore, X-, Y-, and Z-axis coordinate values for the maximum light quantity points on these XY-planes are previously stored together with a Z-axis coordinate value for the maximum light quantity point in the Z-axis direction in the memory, and these coordinate values are utilized during the execution of the correction subroutine of FIG. 12.

In the correction subroutine, X-, Y-, and Z-axis coordinate values of the maximum light quantity points for two XY-planes (designated by XY1 and XY2 in FIG. 11) are read from the memory, and a difference $\delta x$ in X-axis coordinate values, difference $\delta y$ in Y-axis coordinate values, and difference $\delta z$ in Z-axis coordinate values are calculated individually (Step S80). Further, deviations $\delta x/\delta z$ and $\delta y/\delta z$ per unit Z-axis length in the X- and Y-axis directions are calculated (Step S81).

Subsequently, the Z-axis coordinate value of the maximum light quantity point in the Z-axis direction, finally obtained in the fine alignment routine of FIG. 2, is read from the memory. Further, an XY-plane that has a Z-axis coordinate value nearest to the read Z-axis coordinate value is selected in accordance with coordinate value data in the memory, and the Z-axis coordinate value of the selected XY-plane is read from the memory. Then, a difference $\Delta z$ between the Z-coordinate value of the maximum light quantity point in the Z-axis direction and the Z-axis coordinate value on the XY-plane is calculated (Step S82). Further, correction values $\Delta x$ and $\Delta y$ in the X- and Y-axis directions are obtained by multiplying the deviations $\delta x/\delta z$ and δy/δz calculated in Step S81 by the difference Δz in the Z-axis coordinate values (Step S83). The X- and Y-coordinate values of the maximum light quantity point on the XY-plane selected in Step S82 are read from the memory and are corrected with the correction values Δx and Δy, respectively (Step S84).

According to the present embodiment, light quantity measurement for obtaining the optimum point on the XY-plane need not be carried out every time the optical fiber 12 is relatively moved in the Z-axis direction, and the optimum point in the optical axis direction can be obtained speedily and accurately.

The present invention is not limited to the embodiments described above and may be modified variously.

Although the optical axis aligning apparatus used in connecting the LD module device, which includes a light emitting element, and the optical fiber and its operation (optical axis aligning method) have been described in connection with the first to third embodiments, the present invention may be also applied to optical axis alignment between optical fibers or between a light receiving element and an optical fiber. Further, the configuration of the optical axis aligning apparatus and the steps of procedure for alignment are not limited to the embodiments described herein. For example, the θz-stage shown in FIG. 4 is not indispensable. Instead of moving the optical component, e.g., the LD module, and the optical fiber in the X- and Y-axis directions and in the Z-axis direction, respectively, moreover, the optical fiber and the optical component may be moved in the X- and Y-axis directions and in the Z-axis direction, respectively.

What is claimed is:

1. An optical axis aligning method for an optical component, in which the quantity of light emitted from the optical component or an optical fiber and incident upon the other is measured as the optical component and the optical fiber are positioned successively in a plurality of relative positions, to thereby obtain an optimum relative position for a maximum light quantity, comprising steps of:

(a) subjecting light quantity distribution on a given plane parallel to a connecting end face of the optical component or the optical fiber to quadric surface approximation in accordance with measured light quantities at a plurality of points on the given plane, thereby obtaining an optimum point on the given plane; and (b) subjecting light quantity distribution in the direction of the optical axis of the optical component or the optical fiber or in the direction of a given axis perpendicular to the given plane to quadric function approximation in accordance with measured light quantities at a plurality of points in the direction of the optical axis or the given axis, thereby obtaining an optimum point in the direction of the optical axis or the given axis, wherein said step (a) includes a sub-step (a11) for subjecting light quantity distribution in the direction of a first axis, defining the given plane, to quadric function approximation in accordance with measured light quantities at a plurality of points in the first axis direction, a sub-step (a12) for subjecting light quantity distribution in the direction of a second axis, defining the given plane in conjunction with the first axis, to quadric function approximation in accordance with measured light quantities at a plurality of points in the second axis direction, a sub-step (a13) for obtaining the optimum point on the given plane according to the quadric function approximation of the light quantity distribution in the first axis direction and the quadric function approximation of the light quantity distribution in the second axis direction.

2. The optical axis aligning method according to claim 1, wherein said step (a) includes a sub-step (a14) for determining the optimum point on the given plane when the optimum point on the given plane is converged near a given one of the points in the first and second axis directions, and a sub-step (a15) for updating the setup of the points in the first and second axis directions and rerunning the sub-steps (a1) and (a2) when the optimum point on the given plane is not determined.

3. The optical axis aligning method according to claim 1, wherein said step (a) includes a sub-step (a21) for solving simultaneous equations obtained by substituting the measured light quantities at the points on the given plane individually into polynomial approximate expressions representing the light quantities on the given plane as functions of position coordinates on the given plane, thereby obtaining unknown coefficients of the respective terms of the polynomial approximate expressions, a sub-step (a22) for measuring the light quantity at the optimum point on the given plane obtained in the sub-step (a13), a sub-step (a23) for substituting the position coordinates of the optimum point on the given plane into the polynomial approximate expressions having the coefficients determined in the sub-step (a21), thereby obtaining an arithmetic value of the light quantity at the optimum point on the given plane, a sub-step (a24) for determining the optimum point on the given plane when the light quantity measured in the sub-step (a22) is converged near the arithmetic value obtained in the sub-step (a23), and a sub-step (a25) for updating the setup of the points in the first and second axis directions and rerunning the sub-steps (a1) and (a2) when the optimum point is not determined.

4. The optical axis aligning method according to claim 1, wherein said step (a) includes subjecting light quantity distributions on two given planes with different given axial positions to quadric surface approximation, thereby searching for the optical axis direction, and said step (b) includes subjecting light quantity distribution in the searched optical axis direction to quadric function approximation in accordance with measured light quantities at a plurality of points in the searched optical axis direction.

5. An optical axis aligning method for an optical component, in which the quantity of light emitted from the optical component or an optical fiber and incident upon the other is measured as the optical component and the optical fiber are positioned successively in a plurality of relative positions, to thereby obtain an optimum relative position for a maximum light quantity, comprising steps of:

(a) obtaining an optimum point on a given plane parallel to a connecting end face of the optical component or the optical fiber by the simplex method in accordance with measured light quantities at a plurality of points on the given plane; and (b) subjecting light quantity distribution in the direction of the optical axis of the optical component or the optical fiber or in the direction of a given axis perpendicular to the given plane to quadric function approximation in accordance with measured light quantities at a plurality of points in the direction of the optical axis or the given axis, thereby obtaining an optimum point in the direction of the optical axis or the given axis wherein said step (a) includes a sub-step (a11) for selecting a minimum light quantity point for a minimum light quantity, among a required number of first set points on the given plane, in accordance with measured light quantities at the first set points and selecting two other first set points than the minimum light quantity point, a sub-step (a12) for setting a required number of second set points on a straight line extending from the minimum light quantity point to the side opposite from the minimum light quantity point and passing through the middle point of a segment connecting the two first set points and selecting a maximum light quantity point for a maximum light quantity, out of the second set points, in accordance with measured light quantities at the second set points, a sub-step (a13) for selecting the maximum light quantity point as a new first set point in place of the minimum fight quantity point, a sub-step (a14) for obtaining the newly selected first set point as an optimum point on the given plane when the respective lengths of segments connecting the adjacent new first set points are smaller than a maximum allowable value, and a sub-step (a15) for rerunning the sub-steps (a1) and (a2) when the respective lengths of the segments are not smaller than the maximum allowable value.

6. The optical axis aligning method according to claim 5, wherein said sub-step (a11) includes setting three of the first set points on the given plane, and said sub-step (a12) includes setting one second set point between the minimum light quantity point and the middle point of a segment connecting the remaining two first set point, on a straight line extending from the minimum light quantity point and passing through the middle point, and setting two second set points on the side remote from the minimum light quantity point with respect to the middle point.

7. The optical axis aligning method according to claim 5, wherein said step (a) includes obtaining optimum points on two given planes with different given axial positions, thereby determining the optical axis direction, and said step (b) includes subjecting light quantity distribution in the determined optical axis direction to quadric function approximation in accordance with measured light quantities at a plurality of points in the determined optical axis direction.

8. An optical axis aligning apparatus for an optical component, in which the quantity of light emitted from the optical component or an optical fiber and incident upon the other is measured as the optical component and the optical fiber are positioned successively in a plurality of relative positions, to thereby obtain an optimum relative position for a maximum light quantity, comprising:

a first stage movable along a first axis;

a second stage supporting the optical component or the optical fiber and supported on the first stage for movement along a second axis perpendicular to the first axis;

a third stage supporting the optical fiber or the optical component and movable along a third axis perpendicular to the first and second axes;

a light quantity measurer for measuring the quantity of light emitted from the optical component or the optical fiber and incident upon the other; and an arithmetic drive unit for obtaining an optimum point on a given plane defined by the first and second axes by the simplex method or by quadric surface approximation of light quantity distribution on the given plane, in accordance with measured light quantities at a plurality of points on the given plane, obtaining an optimum point in the direction of the third axis by quadric function approximation of light quantity distribution in the direction of the third axis, in accordance with measured light quantities at a plurality of points in the direction of the third axis, and suitably driving the first, second, and third stages so that the optical component and the optical fiber are relatively positioned on the optimum points on the given plane and in the direction of the third axis.

9. The optical axis aligning method according to claim 8, wherein said arithmetic drive unit obtains optimum points on two given planes with different third-axis-direction positions and a deviation between optimum points in the first and second axis directions, and corrects the optimum point on the given plane with the optimum point deviation as the third stage moves in the direction of the third axis.

* * * * *